United States Patent

Tazawa et al.

Patent Number: 5,695,187
Date of Patent: Dec. 9, 1997

[54] EJECT MECHANISM FOR AN IMAGE INPUT DEVICE

[75] Inventors: Masashi Tazawa, Kawasaki; Maki Suzuki, Ichikawa; Eisaku Maeda, Sakura, all of Japan

[73] Assignee: Nikon Corporation, Tokyo, Japan

[21] Appl. No.: 332,081

[22] Filed: Nov. 1, 1994

[30] Foreign Application Priority Data

Nov. 1, 1993 [JP] Japan .................. 5-296144

[51] Int. Cl.$^6$ .................................................. B65H 5/12
[52] U.S. Cl. ...................... 271/266; 271/267; 271/84
[58] Field of Search ........................ 271/3.14, 264, 271/266, 267, 84; 353/108, 114; 358/496, 498, 506

[56] References Cited

FOREIGN PATENT DOCUMENTS

| 0 422 621 | 4/1991 | European Pat. Off. . |
|---|---|---|
| 0 477 872 | 4/1992 | European Pat. Off. . |
| 0 613 283 | 8/1994 | European Pat. Off. . |
| 3-145881 | 6/1991 | Japan . |
| 3-145882 | 6/1991 | Japan . |

*Primary Examiner*—David H. Bollinger
*Attorney, Agent, or Firm*—Oliff & Berridge

[57] ABSTRACT

An image input device is provided with an engagement assembly that releasably engages a document to hold the document on a carriage against the bias force of a biasing member. The engagement assembly includes a stop assembly that releasably engages the document and a release mechanism for releasing the original document from the stop assembly permitting the biasing member to urge the document in a discharge direction. The engagement can be operated either manually or by motor. The document can then be removed from the input device at any time except during the scanning operation.

33 Claims, 12 Drawing Sheets

EJECT MECHANISM FOR AN IMAGE INPUT DEVICE

BACKGROUND OF THE INVENTION

1. Field of the Invention

The present invention relates to an image input device for use in reading the image of a document, such as, for example a transparent original document such as photographic film, using light that has passed through or been reflected from the original document. In particular, the invention relates to an eject mechanism for a document mount that holds the document.

2. Description of Related Art

An image input device includes an illuminator that guides illuminating light to the surface of an original document such as, for example, a transparent original document. A scanner containing a carriage supports and moves the transparent original document to be scanned. A lens forms the light that has passed through the document into an image on a photo-electric sensor element such as, for example, a charge-coupled-device (CCD). Light from the illuminator is focused so that it is linear (i.e., forms a line) on the surface of the transparent original document, and after passing through the document is formed into an image on the CCD, which is read as one line of data. After one line has been read, the scanner moves by an amount equivalent to one line, thereby changing the position of the original document, and the reading process is repeated. By repeating the reading and movement numerous times, scanning of a single original document can be accomplished.

As a conventional image input device structured as described above, Japanese laid-open patent application No. 3-145881 discloses a structure having a support body with an insertion opening formed its surface through which a film (i.e., the transparent original document) is inserted. A conveyor capable of reciprocal movement conveys the original document toward the interior of the body from the film insertion opening. The image input device includes an optical reading mechanism having an optical axis and at least one reading component perpendicular to the direction of conveyance of the conveyor.

When the original document is inserted into the conventional image input device described above, the original document protrudes from the insertion opening. With this arrangement, the user can accidentally touch the original document. This may produce an excessive force on the conveyor causing damage. Furthermore, the original document may tilt relative to the conveyor and become jammed, thereby making normal reading of the original document impossible.

In the conventional image input device described above, the document mount cannot be discharged at an arbitrary time other than during the scanning action. Furthermore, any discharging action is impossible when the power source is not engaged.

SUMMARY OF THE INVENTION

It is an object of embodiments of the present invention to provide an image input device in which the original document can be easily removed after the original document has been read.

It is another object of embodiments of the present invention to provide an image input device in which the installed original document can be held securely without the user of the device touching the original document.

It is another object of embodiments of the present invention to provide a document mount in an image input device that can be discharged at any time except during the scanning action of the image input device.

It is another object of embodiments of the present invention to provide an input device in which the discharge action of the document mount is possible when the power source is not engaged.

It is another object of embodiments of the present invention to provide an input device in which discharging of the document mount can be positively prevented during the scanning action.

In order to achieve the above and other objects, according to one aspect of the present invention, there is provided an image input device having an optical system that forms a light image on an original document and a light sensor that receives light from the original document. A carriage that is capable of movement is provided to hold the original document within the image input device. A guidance assembly controls the movement of the carriage along a linear direction. A biasing assembly applies a biasing force on the original document to urge the original document in a discharge direction for removal of the document from the input device.

An engagement assembly releasably engages the original document to hold the original document in place on the carriage against the biasing force of the biasing assembly. The engagement assembly further includes a stop assembly that releasably engages the original document, fixing the original document to the carriage. Also, the engagement assembly is provided with a release mechanism that releases the original document from the stop assembly, thereby permitting the biasing assembly to urge the document in the discharge direction for removal from the image input device.

The release mechanism preferably includes a rod having a conical end portion that is capable of reciprocal movement along the linear direction in which the carriage moves. The stop assembly has an inclined surface and is capable of rotation in a direction perpendicular to the linear direction. The original document is disengaged from the stop assembly when the conical end of the rod engages the inclined surface of the stop assembly causing the stop assembly to rotate and release the document. The rod has a length such that the rod cannot engage the inclined surface to release the original document when the image input device is performing a scanning operation. The rod can engage the inclined surface at all other times. The rod may be manually operated by the user or driven by a motor into engagement with the inclined surface.

The image input device according to one embodiment of the present invention includes an insert opening sized to permit insertion of the original document into the image input device. The insert opening has an upper portion and a lower portion and at least one of the upper portion and the lower portion is sized to permit a user to grasp the original document with the user's fingers to remove the document from the image input device.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Embodiments of the image input device incorporating one or more aspects of the present invention will be described hereafter with reference to the drawings.

Figure 1:
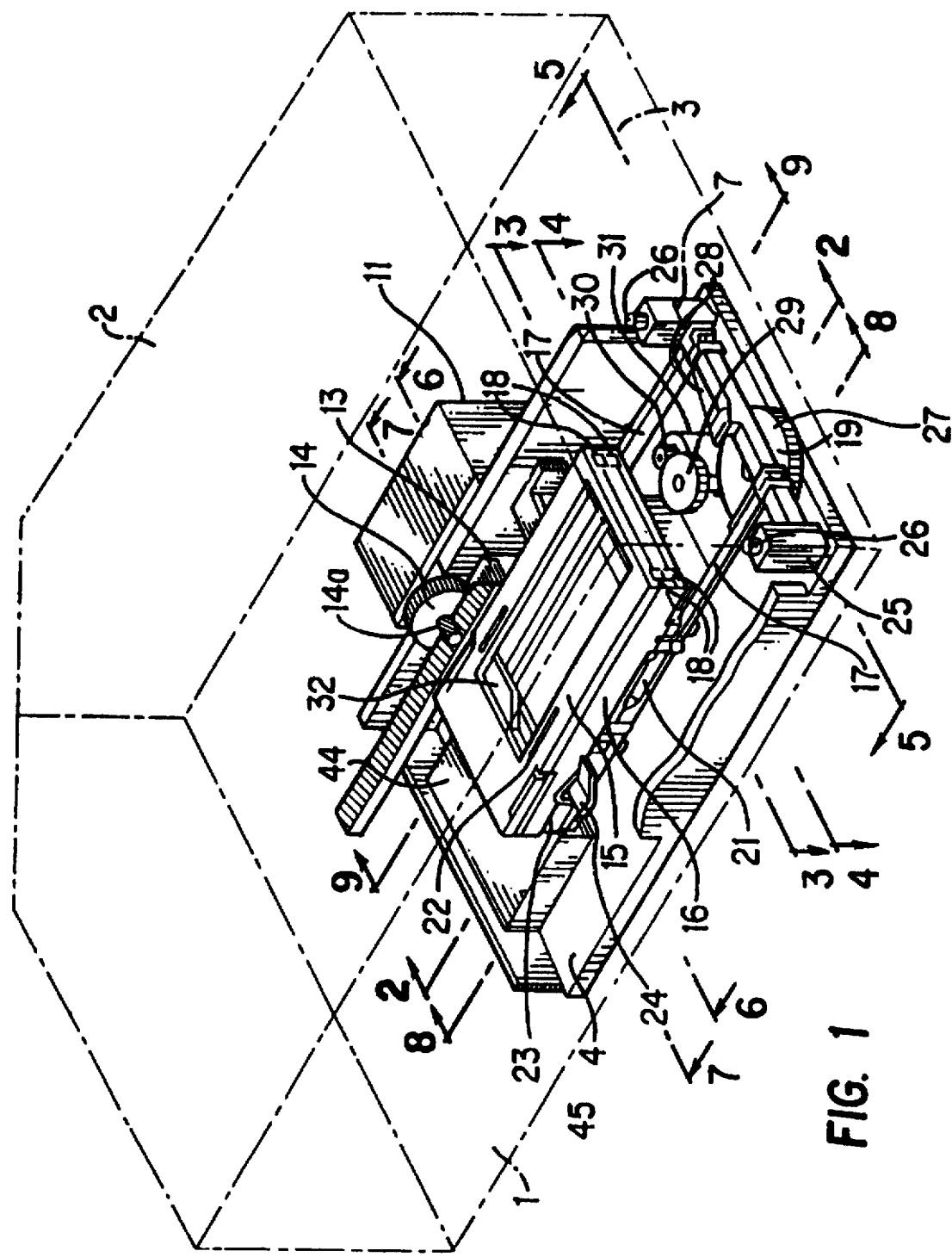
FIG. 1 is an oblique view showing an embodiment of an image input device according to the present invention.

FIG. 1 shows the construction of an image input device in accordance with an embodiment of the present invention. In FIG. 1, the image input device includes an illumination optical component for guiding the illuminating light to the surface of the original document, which is a transparent original. A scanning component moves the carriage 15 and 16, supports the original document, and scans the original document. A projector optical component (for example, a photographic lens) focuses the light that has passed through the original document into an image on a line sensor CCD, which reads the image. These components are housed inside a casing comprised of an aluminum diecast body 1, an aluminum top cover 2, which covers the top of the body 1, 35 and a polycarbonate front panel 3 that covers the front of body 1. In addition, the main base plate 5 and the mechanical body 4, which houses the image reading system comprised of the scanning part, the illuminating optical part and the projector optical part, are attached together with screws. Furthermore, the front of the top cover 2 is held on by the front panel 3, and the back of the top cover 2 is fixed to the body 1 by means of screws, not shown. The image reading system is thus covered by the top cover 2 and the front panel 3.

Figure 2:
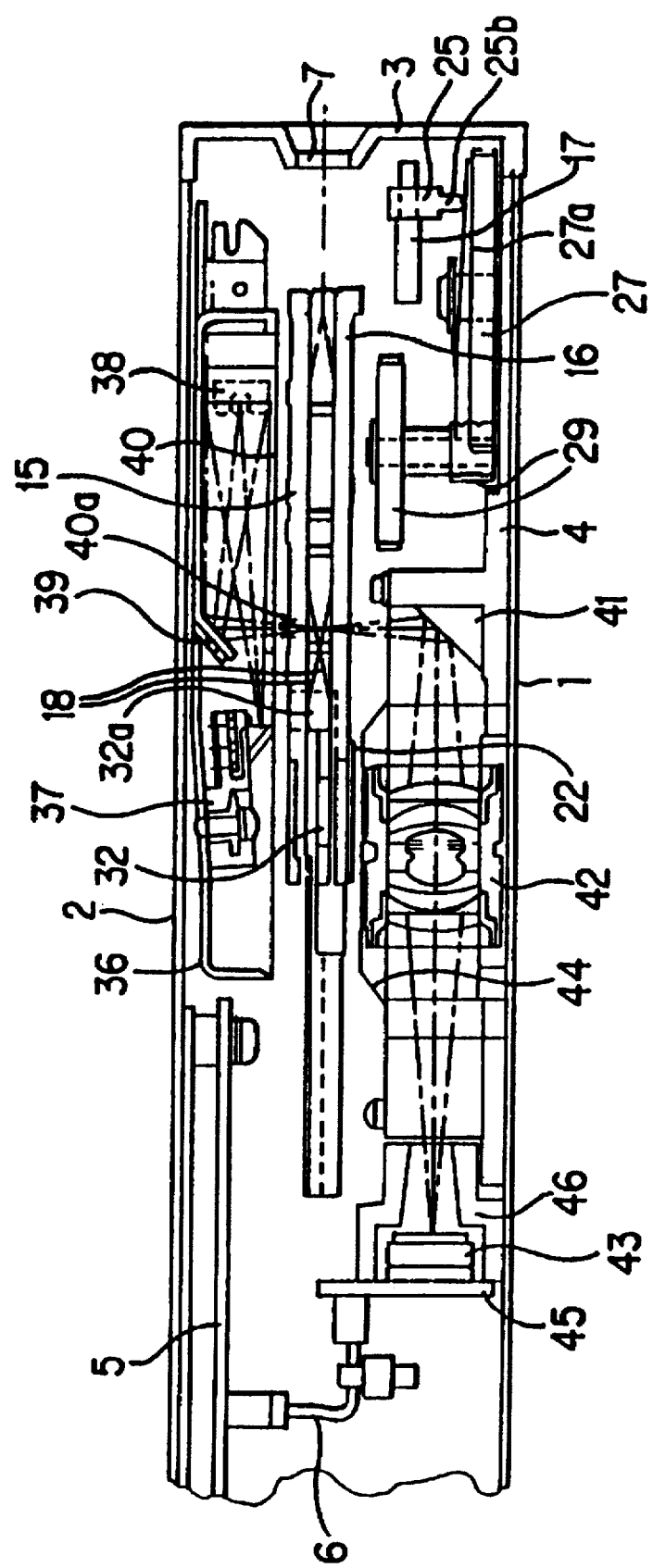
FIG. 2 is a cross section showing an embodiment of an image input device according to the present invention, taken along the line 2—2 in FIG. 1.

The main base plate 5, shown in FIG. 2, and the mechanical body 4 are connected by four sets of harnesses 6. The front panel 3 is provided with an insertion opening 7 into which the document mount can be inserted and an LED window, not shown, used for status display. The outer rim of a manual focus cam 27 protrudes from the front panel 3, as shown in FIG. 1, so that manual focusing operations can be conducted from the front. The focus cam 27 is comprised of a disk-like rotational member that has a cammed upper surface. An eject button 19 also protrudes from the front panel 3, so that it is possible to perform the action of ejecting a document mount inserted into the insertion opening 7. The side of the body 1 opposite the front panel 3 includes a large opening. Consequently, it is possible to provide connections to the various connectors provided on the main base plate 5.

The scanning component includes a carriage component 15 and 16 having a document mount support, a movement mechanism an original document alignment mechanism, and a motor having a power transmission mechanism that transmits motor drive power to the carriage component. The motor includes a stepping motor 11, shown in FIG. 1, and a reduction gear 14a formed as a single body with a pinion gear 14 that reduces the revolutions of the stepping motor 11, and is fixed to a motor attachment plate 12. The motor attachment plate 12 is fixed by screws to the mechanical body 4.

The stepping motor 11 also is affixed by screws to the motor attachment plate 12, and turns a motor gear 13 which is pressed onto the motor shaft. Motor gear 13 is engaged with and turns the pinion gear 14 via the reduction gear. The stepping motor 11 rotates 0.9 times per each single step corresponding to one line on the image.

The illuminating optical component, as shown in FIG. 2, includes an illumination base 36, an LED block 37, a toric mirror 38, a 40° mirror 39 and an illumination system cover 40. The entire body is fastened by a countersunk flat head screw to the mechanical body 4.

The LED block 37 includes a light source and is fixed to the top of the illumination base 36 via an insulating sheet by an insulating collar and screw. The toric mirror 38 is attached to the illumination base 36 so that the mirror can rotate around a cylindrical protrusion provided in the side surface, and is fixed by screws after the angle has been adjusted. The 40° mirror 39 is attached to a bent component formed in the illumination base 36. The illumination system cover 40 is fixed by engagement stops formed in the illumination base 36 in two locations, so that the cover covers the LED block 37, the toric mirror 38 and the 40° mirror 39. Furthermore, a slit is provided above the 40° mirror 39 to allow light to pass through toward the document mount. Light from the outside incident on the inside of the illuminating optical system is blocked by the illuminating system cover 40.

As shown in FIG. 2, the projection optical component includes a 45° reflective mirror 41, a projection lens 42, a CCD 43 and a projection system cover 44. The projection optical component is positioned in the center of the bottom of the mechanical body 4, where it is shielded on three sides by walls. The 45° reflective mirror 41 is attached to the mechanical body 4. The projection lens 42 has a symmetric arrangement of six lenses in four groups fixed to the lens chamber by a separation ring and a holding ring. The lens chamber is fixed to the mechanical body 4 by a set screw. A CCD base plate 45, which houses the CCD 43, is fixed to the mechanical body 4 via the CCD holder 46. The projection system cover 44 is fixed by screws along the perimeter of the part shielded by the walls.

Figure 3:
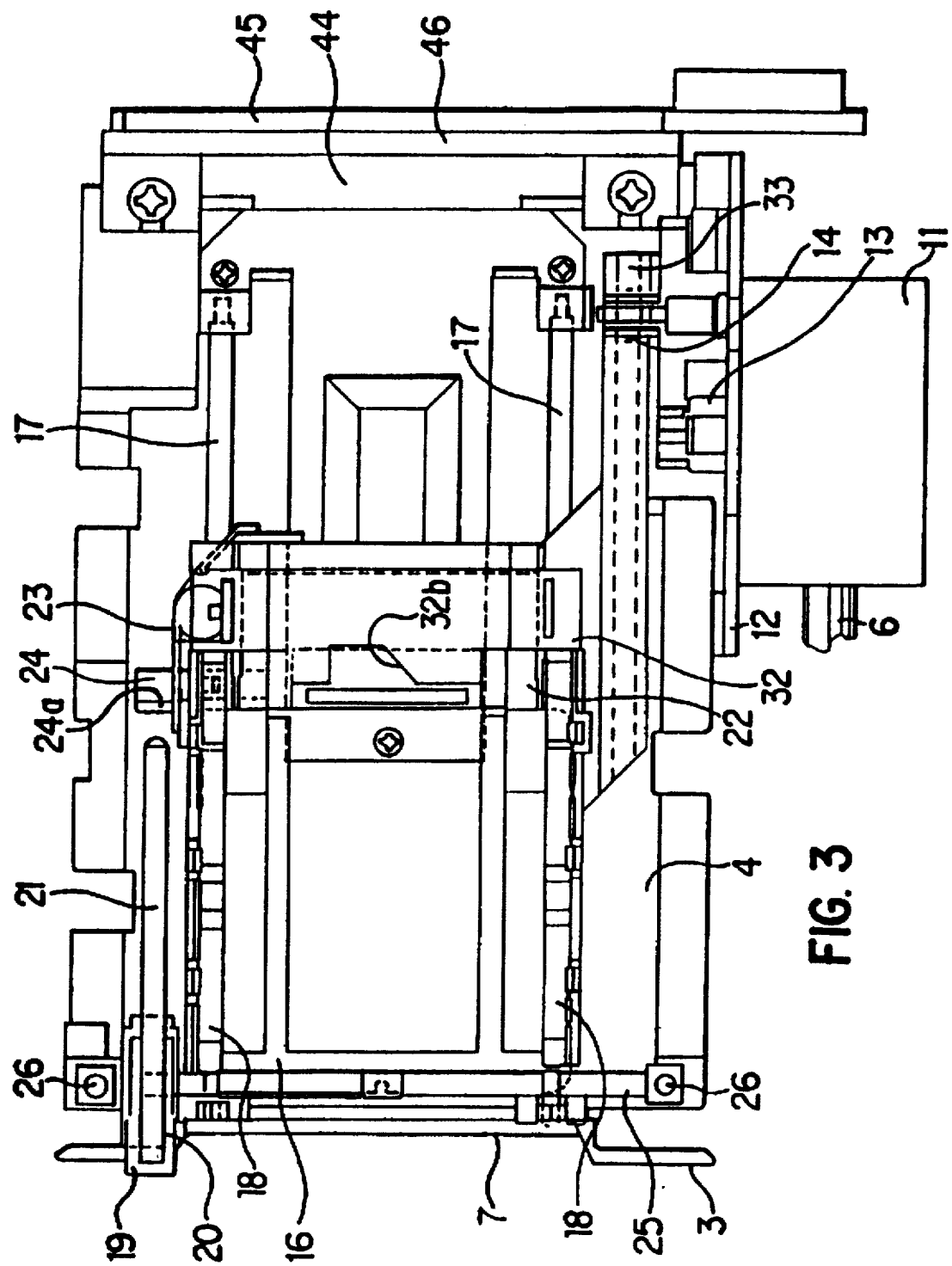
FIG. 3 is a cross section showing an embodiment of an image input device according to the present invention, taken along the line 3—3 in FIG. 1.

With the structure described above, the path of light that passes through the original document is changed 90° by the 45° reflective mirror 41. The light is then formed into an image on the CCD 43 by the projection lens 42. The CCD holder 46 also blocks light and dust. Furthermore, the projection system cover 44 blocks light and dust from reaching the projection optical system as a whole, and also functions as a support for the guide bars 17 of the scanning component, as shown in FIG. 3.

The carriage component includes a carriage 15 and a rack carriage 16 arranged opposite each other in a single body with a certain spacing therebetween. The carriage component can move along a pair of parallel guide bars 17, as shown in FIGS. 1–3. The pair of parallel guide bars 17 each have one end inserted into a slot in the mechanical body 4 and the other end inserted into a focus block 25. The edges of the opposing faces of the carriage 15 and the rack carriage 16 are attached to two document suppression springs 18, which contact the document mount that is inserted between the carriages 15 and 16.

The spring force of the document suppression springs 18 is balanced, as a result of which even when document mounts having different thicknesses are inserted between the carriages 15 and 16, the document mount is always positioned centrally between the carriage 15 and the rack carriage 16. Because the central location between the carriage 15 and the rack carriage 16 is the position of optical focus, even if the mount thickness varies, focus adjustment can be omitted if the surface of the original document is centrally positioned in the mount, as shown in FIG. 2.

In the rack carriage, a bevel rack 16c (FIG. 6) is formed parallel to the direction of movement. The pinion gear 14 fits into the bevel rack 16c so that when drive power from the stepping motor 11 is transmitted, the carriage 15 and the rack carriage 16 are moved.

Figure 4:
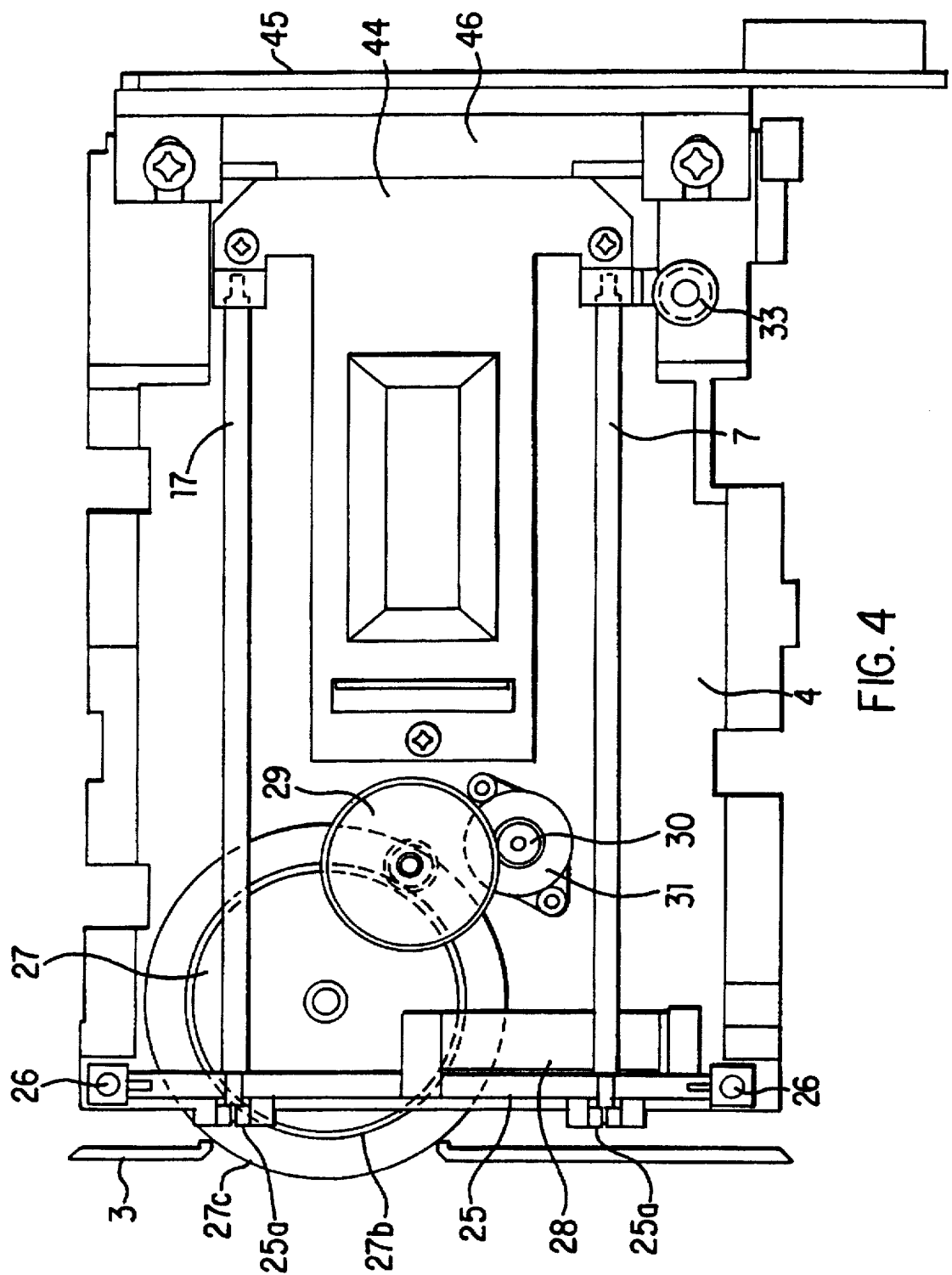
FIG. 4 is a cross section showing an embodiment of an image input device according to the present invention, taken along the line 4—4 in FIG. 1.
Figure 5:
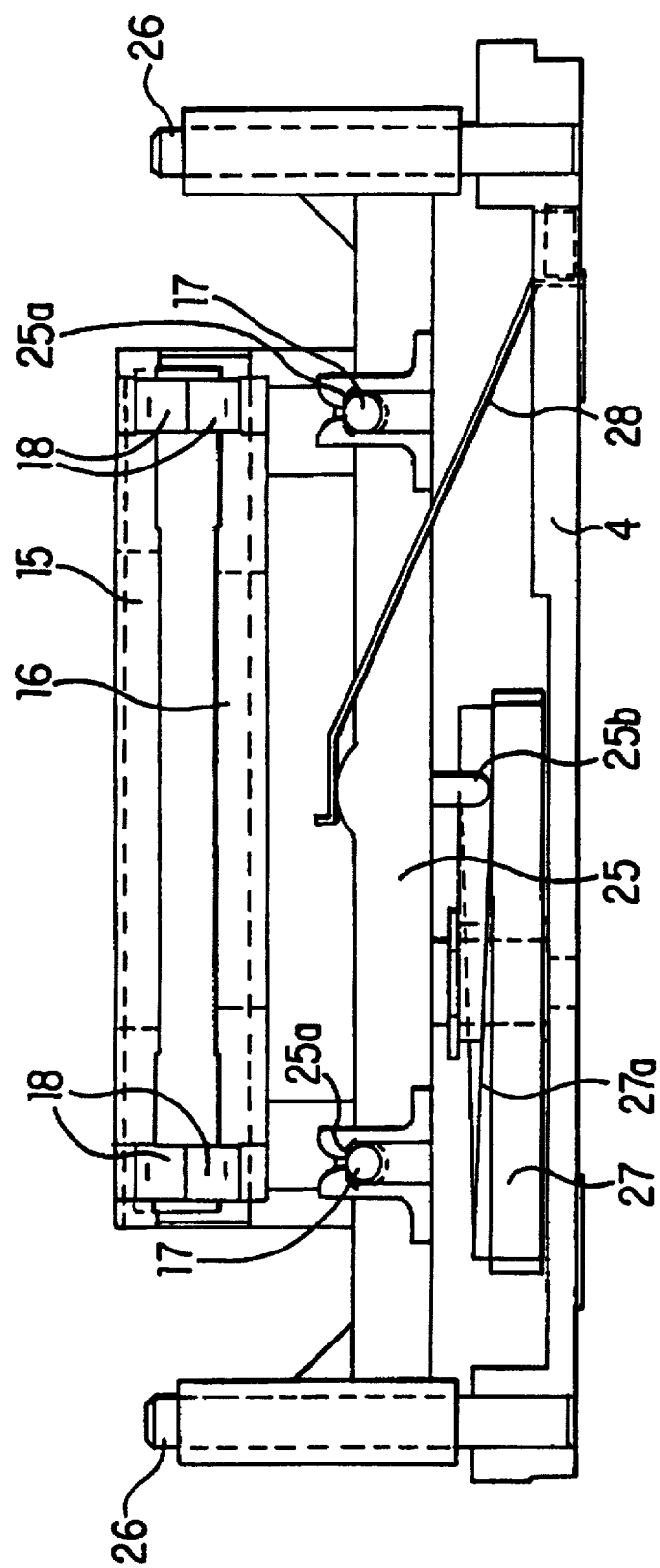
FIG. 5 is a cross section showing an embodiment of an image input device according to the present invention, taken along the line 5—5 in FIG. 1.

The following is a description of the focus adjustment mechanism. Focus adjustment is performed by moving the guide bars 17 up and down. One end of the guide bars 17 is in contact with the focus block 25, and the other end is in contact with the mechanical body 4, and becomes the center of rotational motion, as shown in FIG. 4. Both edges of the focus block 25 are fitted with parallel pins 26 that are attached to the mechanical body 4, allowing motion in the direction of focusing, as shown in FIGS. 1, 3 and 4. A projection 25b having a spherical tip is centered between the two guide bar pressure components 25a of the focus block 25 (FIGS. 4 and 5) and is kept in contact with the focus cam 27 by pressure from the focus block suppression spring 28 (FIGS. 1 and 5). The cam surface 27a of the focus cam 27 is inclined to a height of about 2 mm in the focusing direction, focus adjustment being performed by rotating the focus cam 27. The projection 25b of the focus block 25, which is in contact with the focus cam 27 is centered between the guide bars 17. Consequently, even if there is a shift between the focus block 25 and the parallel pins 26, the guide bars 17 are raised or lowered in the focusing direction without becoming tilted. The image reading position is centered between the guide bars 17, and by changing the position of one end of the guide bars 17 by about ±1 mm using the focus cam 27, the reading position can be adjusted by about 35 0.5 mm.

A gear is formed on the side surface 27b of the focus cam 27 and is linked to the AF motor gear 30 via an idle gear 29. The AF motor gear 30 is pressed onto the shaft of the AF motor 31, making automatic focusing possible through the rotation of the AF motor 31. To perform manual focusing without using the auto focus mechanism, the AF motor 31 and idle gear 29 are omitted and the gear on the side surface 27b of the focus cam is changed into a roulette or lever protruding from the front panel 3. The focus cam 27 can then be turned by hand making manual focusing possible.

Figure 7:
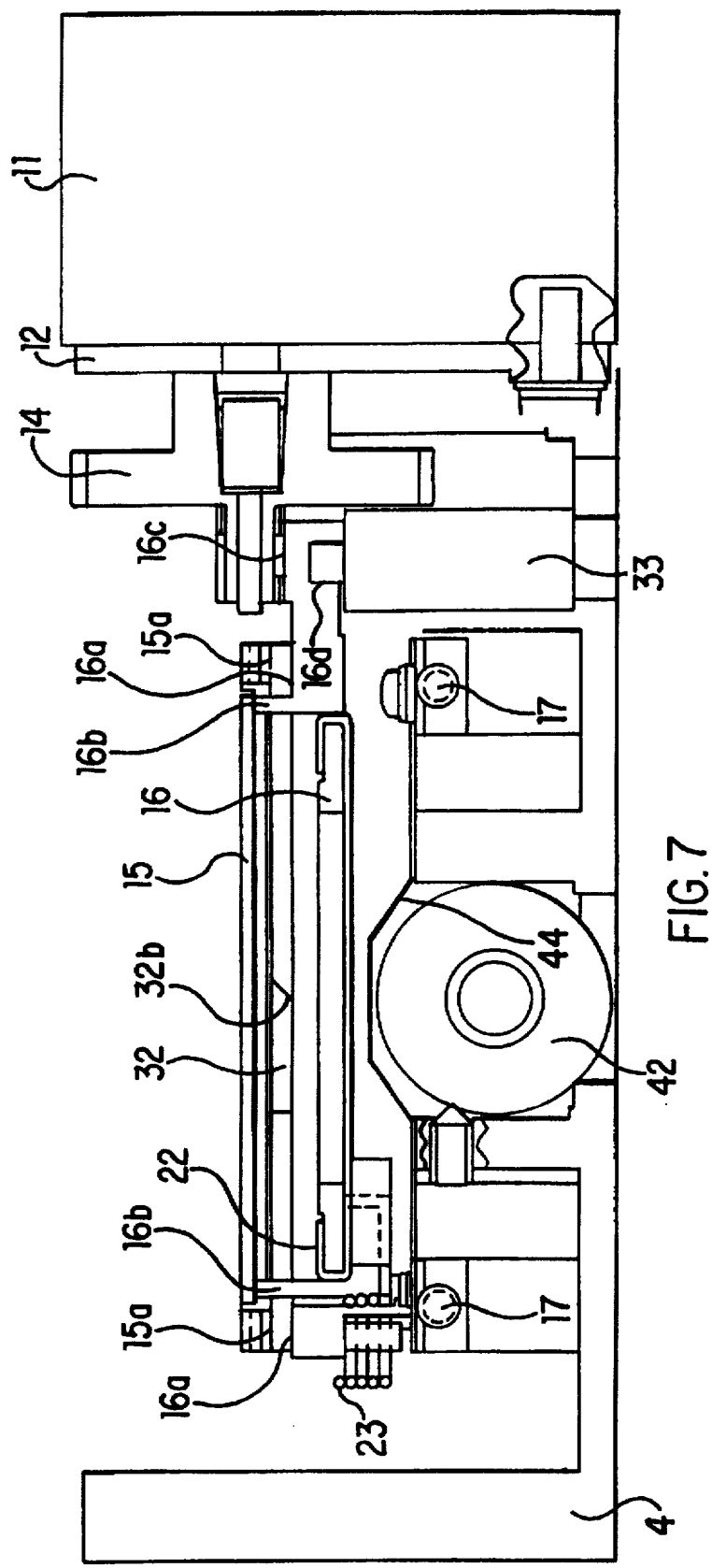
FIG. 7 is a cross section showing an embodiment of an image input device according to the present invention, taken along the line 7—7 in FIG. 1.
Figure 9:
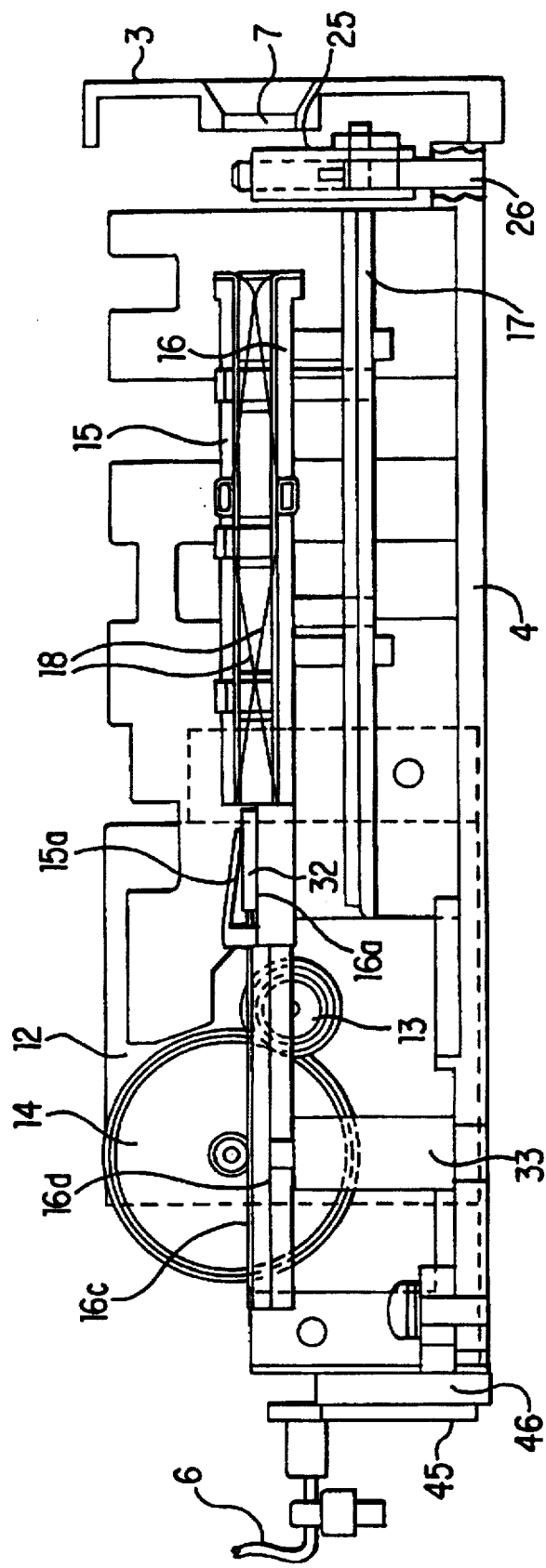
FIG. 9 is a cross section showing an embodiment of an image input device according to the present invention, taken along the line 9—9 in FIG. 1.

The following is a description of the origin detection mechanism used for motion in the focusing direction and in the carriage component secondary scanning direction. The edge detection plate 32 is sandwiched between the rack carriage 16 and the carriage component 15. The protrusion 16b on the rack carriage 16 serves as a guide permitting movement of the origin detection mechanism in the focusing direction, as shown in FIG. 7. The edge detection plate 32 is pressed against the rack carriage focusing direction limiter 16a by an erect component 15a formed in a spring shape on the carriage component 15, as shown in FIGS. 7 and 9. An inclined surface 32a formed on one end of the edge detection plate 32 permits insertion of a film holder for strip films. The origin detection component 32b of the edge detection plate 32 as shown in FIG. 7, is inclined at an angle of about 45° relative to the secondary scanning direction. It is also inclined at an angle of about 45° relative to the focusing direction. Origin detection is accomplished using this edge component 32b. The vertical section of the edge component in the focusing direction is positioned between the carriage component 15 and the rack carriage 16.

The following is an explanation of the principle of origin detection. First, the carriage component is moved to a position where the origin detection component 32b of the edge detection plate 32 can almost be read by the CCD 43. The AF motor 31 is then rotated and the carriages 15 and 16 are moved up or down in the focusing direction. The contrast in one line of data (i.e., the line of data read by CCD 43) is checked. At the in-focus position, the change from black to white is nearly a right angle, and it becomes less inclined the more the position is shifted from this in-focus position. The origin in the focusing direction is the carriage position in the focusing direction where the most vertical change from black to white is obtained from one line of data.

When the edge detection plate 32 is in-focus, origin detection can be performed in the secondary scanning direction. When the inclined surface 32b of the edge detection plate 32, which is inclined at a 45° angle from the secondary scanning direction, is read by the CCD 43, the address in the primary scanning direction where black changes to white varies with movement of the carriages 15 and 16 in the secondary scanning direction. The carriage position in the secondary scanning direction that agrees with the address indicated by this primary scanning direction address is referred to as the secondary scanning direction origin of the carriages 15 and 16.

Figure 6:
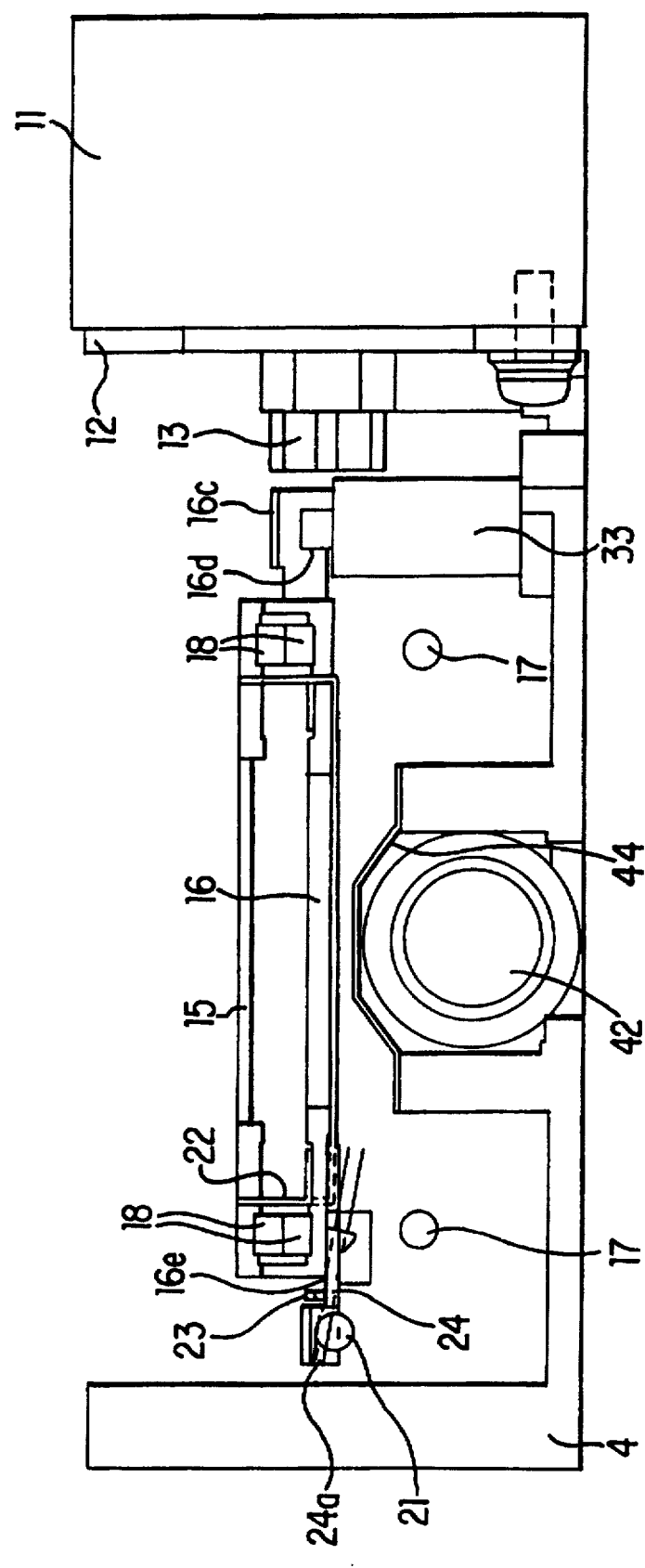
FIG. 6 is a cross section showing an embodiment of an image input device according to the present invention, taken along the line 6—6 in FIG. 1.

A groove 16d, as shown in FIGS. 6 and 7, is formed in the lengthwise direction on the back side of rack 16c of the rack carriage 16. A rack support bar 33 is pressed onto the mechanical body 4 and fitting into the groove 16d allowing movement of the carriage rack 16. Through this arrangement, the camber of the rack 16c is suppressed and the fit with the pinion gear 14 is made certain.

By fixing the rack support bar 33 to the mechanical body 4, the guide bars 17 limit the movement of the rack carriage 16 in the secondary scanning direction. Consequently, it is possible to minimize positional error between the guide bars 17 and the rack carriage groove 16d. Accordingly, it becomes possible for the carriage component to move smoothly in the secondary scanning direction.

Figure 11:
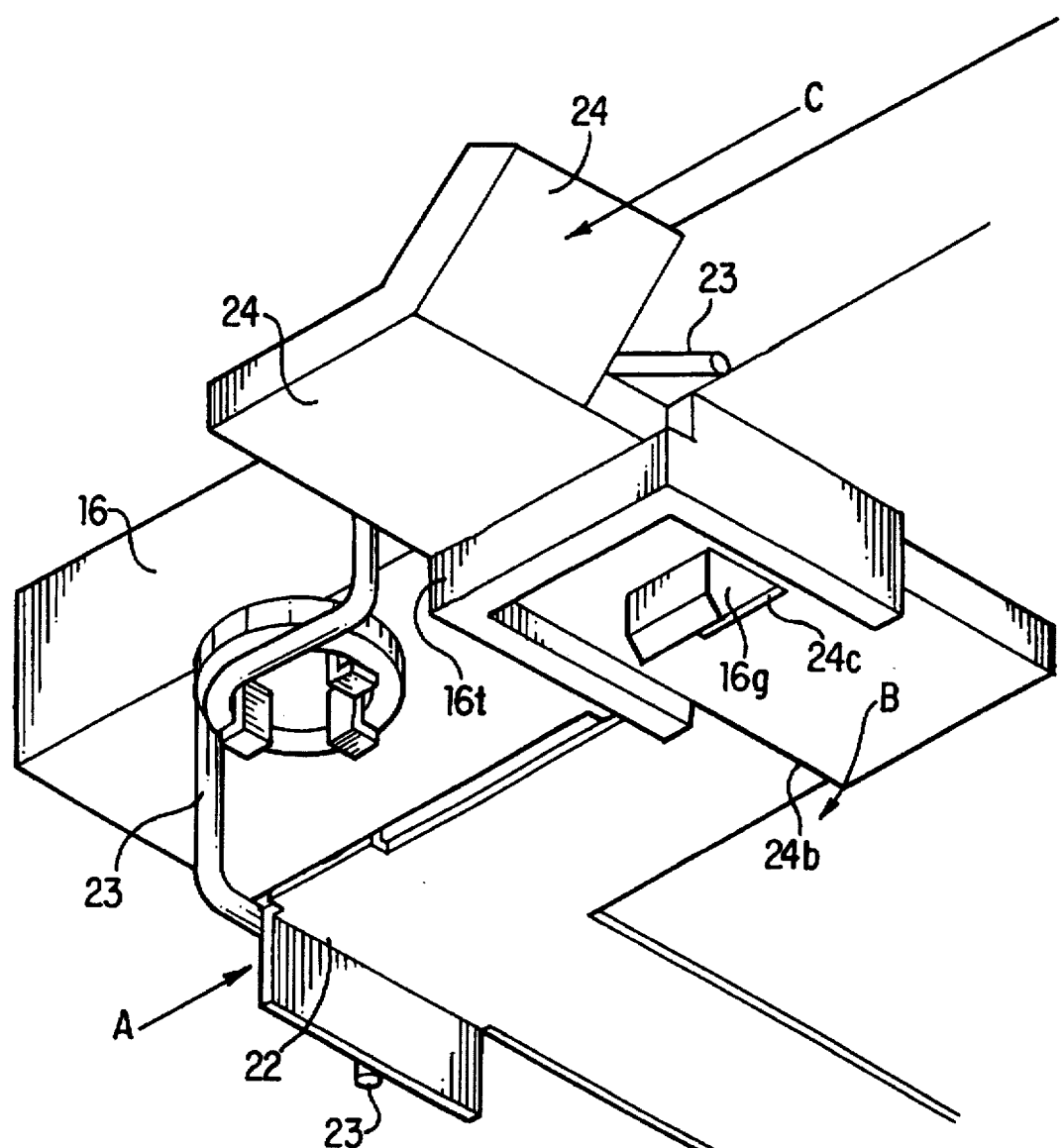
FIG. 11 is an oblique view showing an embodiment of an image input device according to the present invention.

The following is a description of the eject mechanism. As shown in FIG. 11, the eject plate 22 is attached to the rack carriage 16 and is capable of movement. An eject spring 23 attached to the rack carriage 16 contacts the eject plate 22 and applies a force on the eject plate 22 in the document mount discharge direction (i.e., in the direction indicated by arrow A). Movement of the eject plate 22 in the discharge direction is limited by an engagement stop plate 24. The engagement stop plate 24 is attached to the rack carriage 16. The engagement part 24a protrudes from the rack carriage 16 and is inclined at approximately a 45° angle. The engagement stop part 24b engagingly stops the eject plate 22.

Figure 12:
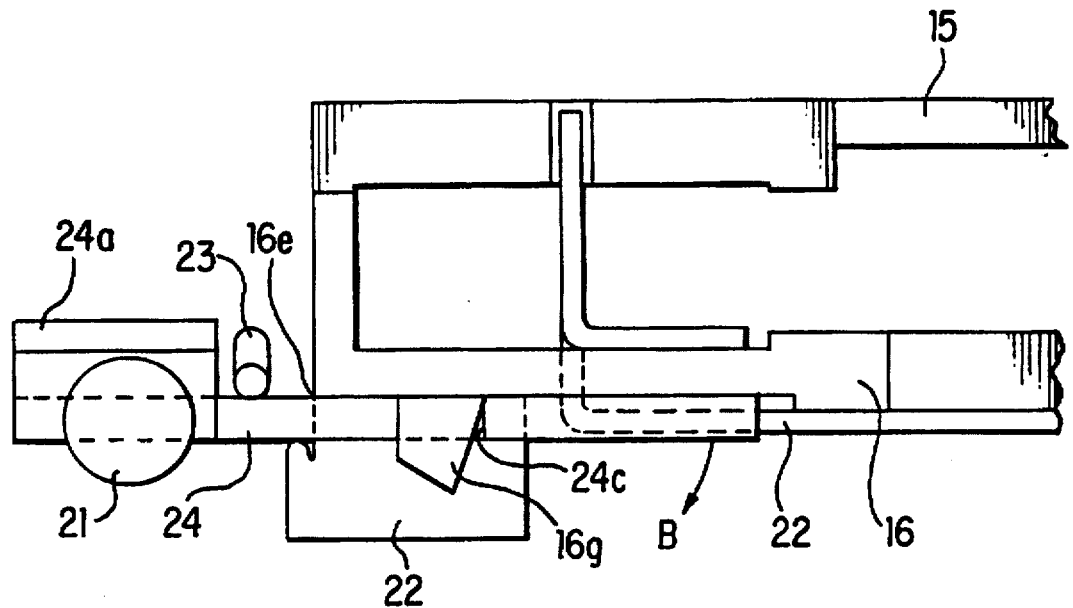
FIG. 12 is a front view showing an embodiment of an image input device according to the present invention.

A protrusion 16g extending from the rack carriage 16 fits into a hole 24c located in the center of engagement stop plate 24. The engagement stop plate 24 is supported by a support piece 16f located on a corner of the rack carriage 16, as shown in FIG. 11. The protrusion 16g fitted into the hole 24c prevents the engagement stop plate 24 from falling off. The engagement stop plate 24 rotates in the direction indicated by arrow B, as shown in FIGS. 11 and 12. The fulcrum 16e on the rack carriage 16 serves as the center of rotation for the engagement stop plate 24.

An eject button 19 mounted on the front panel 3 is biased forward by the button spring 20, as shown in FIG. 3. An eject bar 21 is connected to the eject button 19. An E-ring, not shown, is secured to the eject bar 21 to prevent it from disengaging from the eject button 19. The tip of the eject bar 21 has a conical shape (for example, approximately a 45° cone).

An operator inserts the document mount to move the eject plate 22 (i.e., in the reverse direction indicated by arrow A in FIG. 11). This charges (e.g., compresses) the eject spring 23. When the operator inserts the document mount, the engagement stop plate 24 engagingly stops the eject plate 22, as shown in FIG. 12. At this point, the document mount is set in the carriages 15 and 16. The image data of the document can now be read.

Figure 8:
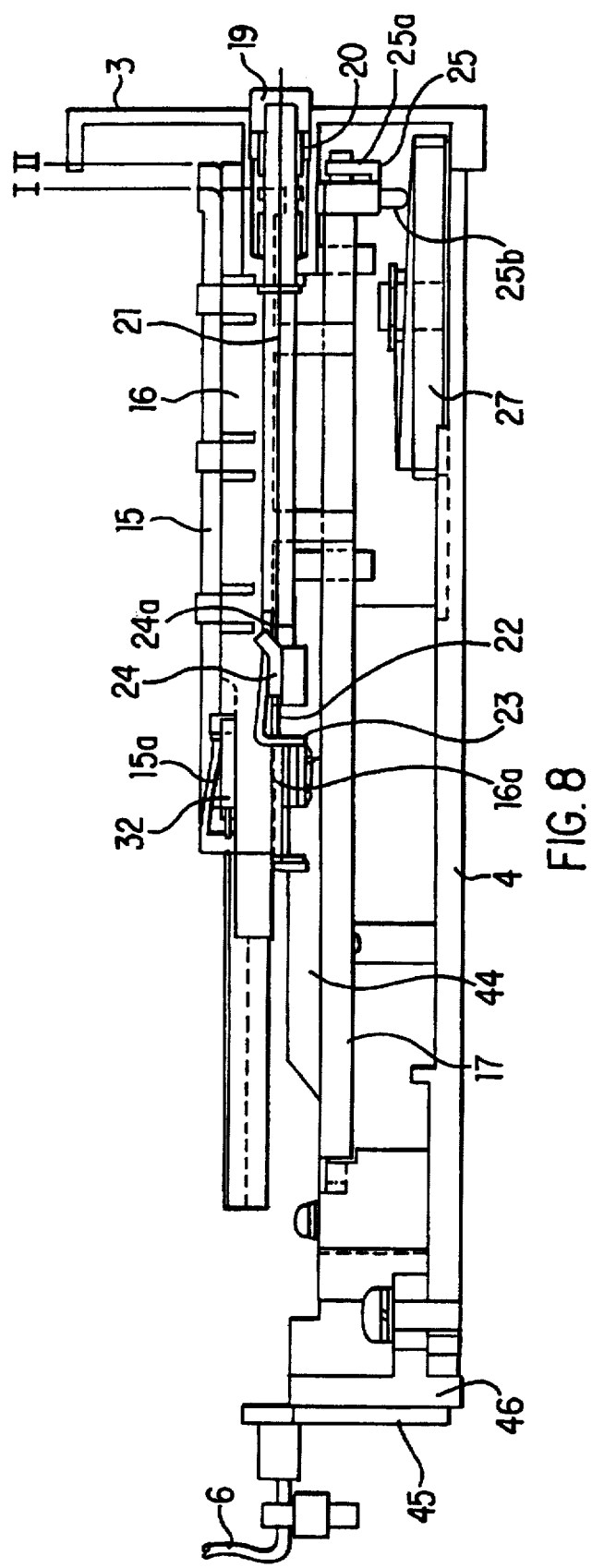
FIG. 8 is a cross section showing an embodiment of an image input device according to the present invention, taken along the line 8—8 in FIG. 1.

The carriage component returns to the carriage return position I, shown in FIG. 8, when the original document is inserted and after the image data has been read. When the carriage is in carriage return position I and the eject button 19 is pressed, the conical tip of the eject bar 21 contacts the approximately 45° surface 24a of the engagement stop plate 24 in the direction indicated by arrow C, shown in FIG. 11. When the eject button 19 is further depressed, engagement stop plate 24 rotates in a direction of separation from the rack carriage 16 (i.e., in the direction indicated by arrow B in FIGS. 11 and 12). The eject plate 22 is then separated from the engagement stop part 24b and is capable of moving in the discharge direction (i.e., the direction indicated by arrow A in FIG. 11). The document mount is then discharged under the spring force of the eject spring 23 so that the document mount can be retrieved.

Figure 13:
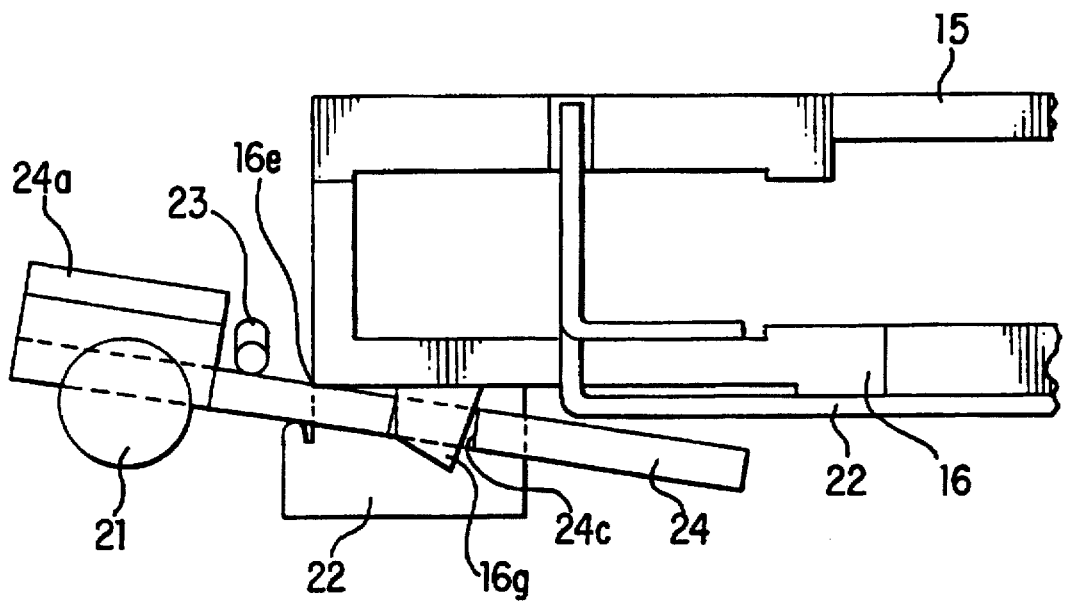
FIG. 13 is a front view showing an embodiment of an image input device according to the present invention.

The document mount can also be automatically ejected from the image input device. With auto eject, the carriage component is moved to the document mount eject position II, as shown in FIG. 8, by rotating the stepping motor 11. The conical tip of the eject bar 21 contacts the approximately 45° surface 24a of the engagement stop plate 24 from the direction indicated by arrow C, shown in FIG. 11. The engagement stop plate 24 rotates in the direction of separation from the rack carriage 16 with the fulcrum 16e of the rack carriage 16 serving as its center of rotation (refer to FIGS. 6, 12 and 13). The eject plate 22 is then separated from the engagement stop part 24b and is capable of moving in the discharge direction (i.e., the direction indicated by arrow A in FIG. 11). The document mount is then discharged under the spring force of the eject spring 23 so that the document mount can be retrieved.

Figure 10:
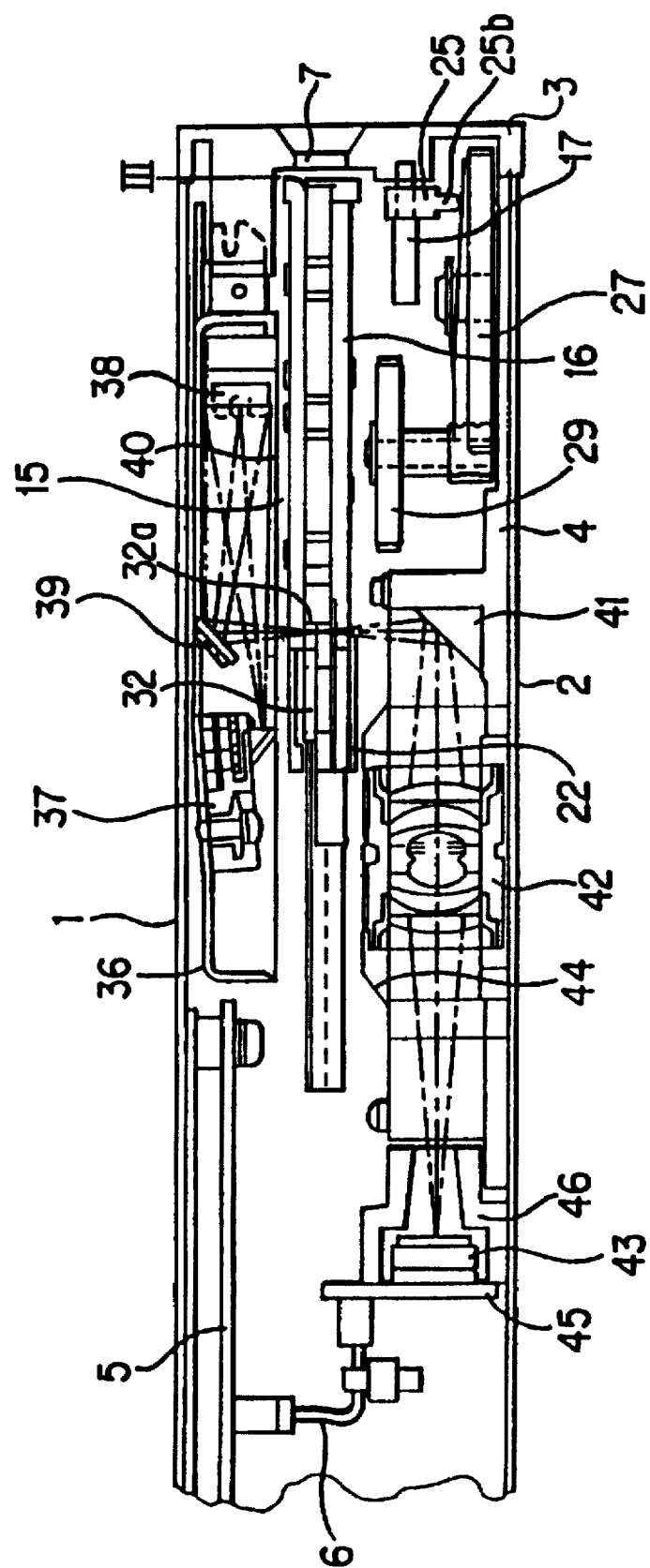
FIG. 10 is a cross section showing an alternative embodiment of the film mount retrieval mechanism in an embodiment of an image input device according to the present invention.

FIG. 10 depicts an alternative embodiment of the document mount retrieval mechanism. The document mount insertion opening 7 in the front panel 3, as shown in FIG. 10, has a top portion and a bottom portion sized to permit the document mount to be pulled out by the user's fingers. The carriage component is designed so that it always returns to carriage return position III when the document is inserted and after the image data has been read. The document mount in this arrangement can be retrieved by the user without the use of an eject mechanism. The shape of the top portion and the bottom portion of the document mount insertion opening 7 of the front panel 3 extend toward the interior farther than the position of the tip of the carriage component in the carriage return position, as shown in FIG. 10. The impact on the use of the interior space can be limited by shaping the top portion and the bottom portion of the document mount insertion opening 7 to conform to the shape of the user's fingers. Alternatively, the insertion opening 7 can be sized such that only the top portion or the bottom portion is sized to permit the user to pull the document mount out by the user's fingers. This further reduces the amount of interior space needed to permit removal by a user's fingers.

As explained in the embodiments above, the eject bar 21 reciprocally moves in the direction of the guide bars 17. When the engagement between the document mount and the engagement stop plate 24 is released by the engagement of the eject bar 21 with the engagement stop plate 24, the engagement stop plate 24 rotates. This permits the document mount to be discharged at any time other than during the scanning action. Furthermore, discharge action is possible even when the power source has not been engaged. Moreover positive discharging of the document mount is prevented during the scanning action.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image input device having an optical system that forms a light image on an original document and a light sensor that receives light from the original document, comprising:

a movable carriage for holding the original document;

a guidance assembly that controls movement of the carriage along a linear direction, said guidance assembly engaged with said carriage;

a biasing member that applies force on the original document held in the carriage to urge the original document in a discharge direction; and a stop mechanism to retain the original document in position relative to the carriage against the force applied by the biasing member.

2. The image input device according to claim 1, wherein the stop mechanism further includes a stop member that releasably engages the biasing member and fixes the document in said position relative to the carriage.

3. The image input device according to claim 2, wherein a release mechanism release the engagement between the stop member and the biasing member, said release mechanism being engageable with said stop mechanism.

4. The image input device according to claim 3, wherein the release mechanism includes a rod that is mounted for reciprocal movement along said linear direction and the stop mechanism is mounted for rotation in a direction perpendicular to said linear direction such that engagement of the rod with the stop mechanism causes rotation of the stop mechanism, which releases the engagement between the stop member and the biasing member.

5. The image input device according to claim 4, wherein the release mechanism includes an actuation member connected to said rod that can be manually driven by a user to release the engagement between the stop member and the biasing member.

6. The image input device according to claim 5, wherein the release mechanism can release the engagement between the stop member and the biasing member without an electrical power source.

7. The image input device according to claim 4, wherein the release mechanism includes an automatic actuation device that moves said movable carriage in said linear direction to automatically engage the stop mechanism with the rod of the release mechanism to release the engagement between the stop member and the biasing member.

8. The image input device according to claim 7, wherein the automatic actuation device includes a stepping motor.

9. The image input device according to claim 4, wherein the stop mechanism includes an inclined surface and the rod engages the inclined surface to rotate the stop mechanism so as to release the engagement between the stop member and the biasing member.

10. The image input device according to claim 4, wherein the rod has a length such that the rod does not engage the stop mechanism to release the engagement between the stop member and the biasing member when the carriage is positioned to perform a scanning operation.

11. The image input device according to claim 1, further comprising:

an insert opening in a housing of the image input device, said insert opening sized to permit insertion of the original document into the image input device.

12. The image input device according to claim 11, wherein said insert opening has an upper portion and a lower portion and at least one of the upper portion and the lower portion is sized to permit a user to grasp the original document with the user's fingers.

13. The image input device according to claim 12, wherein both of the upper portion and the lower portion are sized to permit a user to grasp the original document with the user's fingers.

14. The image input device according to claim 1, wherein the biasing member is a spring member.

15. The image input device according to claim 14, wherein the spring member is connected to the carriage.

16. An image input device having an optical system for forming a light image on an original document and a light sensor for receiving light from the original document, comprising:

document holding means for holding an original document;

guiding means for guiding movement of the document holding means along a linear direction;

biasing means for biasing the original document held by the document holding means in a discharge direction; and releasable engagement means for releasably engaging the original document to hold the original document in position relative to the document holding means against the biasing means.

17. The image input device according to claim 16, wherein the releasable engagement means further includes stop engagement means for releasably engaging the original document and fixing the original document to the document holder means.

18. The image input device according to claim 17, wherein the releasable engagement means further includes engagement release means for releasing the engagement between the stop engagement means and the original document.

19. The image input device according to claim 18, wherein the release engagement means includes a member that is mounted for reciprocal movement along said linear direction, and the stop engagement means is mounted for rotation in a direction perpendicular to said linear direction such that engagement of the member and the stop engagement means causes rotation of the stop engagement means which releases the engagement between the stop engagement means and the original document such that the biasing means moves the original document in the discharge direction.

20. The image input device according to claim 19, wherein the stop engagement means includes an inclined surface and the member engages the inclined surface to rotate the stop engagement means so as to release the engagement between the stop engagement means and the original document.

21. The image input device according to claim 20, wherein the member has a length such that the member does not engage the inclined surface to release the engagement between the stop engagement means and the original document when the document holding means is positioned to perform a scanning operation.

22. The image input device according to claim 16, further comprising:

an insert opening in a housing of the image input device sized to permit insertion of the original document into the image input device.

23. The image input device according to claim 22, wherein said insert opening has an upper portion and a lower portion and at least one of the upper portion and the lower portion is sized to permit a user to grasp the original document with the user's fingers.

24. The image input device according to claim 16, wherein the biasing means is a spring assembly connected to the document holding means.

25. A method of removing an original document from an image input device having an optical system that forms a light image on the original document, and a light sensor that receives light from the original document, said original document being held in a carriage that is movable in a linear direction in said image input device, said method comprising the steps of:

biasing said original document against a stop member on said carriage with a bias force;

moving at least one of the carriage and a release mechanism towards each other in said linear direction;

engaging said release mechanism with said stop member on said carriage so that said stop member moves out of engagement with the original document and ejecting said original document from the image input device under the influence of said bias force.

26. The method according to claim 25, wherein the ejecting step comprises ejecting the original document through an insert opening in a body of the image input device.

27. The method according to claim 25, wherein the engaging step comprises reciprocally moving a rod of said release mechanism along the linear direction, wherein the stop member is rotatable in a direction perpendicular to said linear direction, and wherein engagement of the rod and stop member causes rotation of the stop member which releases the original document from the stop member.

28. The method according to claim 27, wherein the engaging step comprises engaging an inclined surface of the stop member with the rod to release the original document from the stop member.

29. The method according to claim 27, wherein the engaging step comprises providing the rod with a length such that the rod does not engage the inclined surface to release the original document when the carriage is positioned to perform a scanning operation.

30. The method according to claim 25, wherein the moving step comprises manually moving said release mechanism toward said carriage.

31. The method according to claim 25, wherein the moving step comprises automatically driving said carriage toward said release mechanism.

32. A method of removing an original document from an image input device having an optical system that forms a light image on the original document being held in a carriage that is movable in a linear direction in said image input device, said method comprising the steps of:

charging an eject spring by inserting the original document into the image input device;

catching the eject spring with a catch to hold the original document in the carriage;

scanning an image on the original document; and releasing the catch of the eject spring to eject the original document from the image input device.

33. A method of removing an original document from an image input device having an optical system that forms a light image on the original document, a light sensor that receives light from the original document, a movable carriage coupled to a guidance assembly, an engagement assembly and a biasing member, said method comprising the steps of:

moving and guiding the original document with the carriage and said guidance assembly in a linear direction;

applying a biasing force to the original document with the biasing member to urge the original document in a discharge direction;

engaging the original document with the engagement assembly to hold the original document in position relative to the carriage; and releasing the engagement assembly such that the original document is ejected from the image input device under the influence of the biasing force.

\* \* \* \* \*